US012631466B2

(12) United States Patent　　(10) Patent No.:　US 12,631,466 B2
Shiratsuchi et al.　　(45) Date of Patent:　　May 19, 2026

(54) IMAGE PROCESSING DEVICE FOR NOTIFYING AN APPROACH OF AN EMERGENCY VEHICLE

(71) Applicant: DENSO CORPORATION, Kariya-city (JP)

(72) Inventors: Toshiharu Shiratsuchi, Kariya-city (JP); Shiori Maneyama, Kariya-city (JP); Tetsuya Enokizaka, Kariya-city (JP); Kaneyasu Koide, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 246 days.

(21) Appl. No.: 17/994,828

(22) Filed: Nov. 28, 2022

(65) Prior Publication Data

US 2023/0168104 A1　　Jun. 1, 2023

Related U.S. Application Data

(63) Continuation of application No. PCT/JP2021/022161, filed on Jun. 10, 2021.

(30) Foreign Application Priority Data

Jun. 11, 2020　(JP) ................................. 2020-101593

(51) Int. Cl.
　G01C 21/36　　(2006.01)
　G08G 1/16　　(2006.01)
(52) U.S. Cl.
　CPC ........... G01C 21/367 (2013.01); G08G 1/166 (2013.01)

(58) Field of Classification Search
　CPC .... G01C 21/367; G08G 1/166; G08G 1/0962; G08G 1/0965; B60W 2554/402;
　(Continued)

(56) References Cited

U.S. PATENT DOCUMENTS 9,278,689 B1 *　3/2016　Delp .................... G08G 1/0965
9,691,278 B2 *　6/2017　Poornachandran .........................
　　　　　　　　　　　　　　　　G08G 1/096783
(Continued)

FOREIGN PATENT DOCUMENTS

JP　　2017200812 A　11/2017
JP　　2019-010929 A　1/2019
　(Continued)

*Primary Examiner* — Kenny Nguyen
(74) *Attorney, Agent, or Firm* — Harness, Dickey & Pierce, P.L.C.

(57)　　ABSTRACT

An image processing device includes an information acquisition unit, a condition determination unit, and an image change unit. The information acquisition unit acquires information indicating a position of an emergency vehicle. The condition determination unit determines, based on the information acquired by the information acquisition unit, (a) a first condition which is satisfied when the emergency vehicle is determined to be approaching the subject vehicle, and (b) a second condition which is satisfied when a distance from the emergency vehicle to the subject vehicle or an estimated reach time required for the emergency vehicle to reach the subject vehicle is equal to or less than a preset threshold. The image change unit changes the image in response to the first condition and the second condition being satisfied during an autonomous driving state of the subject vehicle. The image after change is an overhead view image.

5 Claims, 13 Drawing Sheets

(58) Field of Classification Search
CPC ..... B60W 2554/4041; B60W 60/0053; B60W 2050/146; B60W 2554/4044; B60W 50/14
See application file for complete search history.

(56) References Cited

U.S. PATENT DOCUMENTS

| | | | | |
|---|---|---|---|---|
| 10,065,503 B2* | 9/2018 | Tauchi | .................... | B60K 35/29 |
| 10,800,258 B2* | 10/2020 | Tauchi | .............. | G02B 27/0101 |
| 10,960,761 B2* | 3/2021 | Tachibana | ............. | G01C 21/26 |
| 11,072,343 B2* | 7/2021 | Emura | ................. | G05D 1/0257 |
| 2011/0293145 A1* | 12/2011 | Nogami | ................. | G08G 1/167 |
| | | | | 382/103 |
| 2014/0297181 A1* | 10/2014 | Kondo | .............. | G08G 1/09626 |
| | | | | 701/532 |
| 2015/0258936 A1* | 9/2015 | Takaki | ................ | H04N 23/698 |
| | | | | 348/148 |
| 2015/0286880 A1* | 10/2015 | Itou | ......................... | B60L 53/37 |
| | | | | 348/148 |
| 2016/0098926 A1* | 4/2016 | Probert | ................... | G01S 11/02 |
| | | | | 340/903 |
| 2016/0284218 A1* | 9/2016 | Ejiri | ...................... | G08G 1/166 |
| 2016/0311323 A1* | 10/2016 | Lee | ........................ | B60K 35/10 |
| 2016/0332569 A1* | 11/2016 | Ishida | .................... | B60Q 9/008 |
| 2017/0032670 A1* | 2/2017 | Poornachandran | ......................... G08G 1/096783 |
| 2017/0106750 A1* | 4/2017 | Tauchi | ...................... | B60R 1/27 |
| 2017/0113686 A1* | 4/2017 | Horita | ................... | B60W 10/20 |
| 2017/0330463 A1 | 11/2017 | Li et al. | | |
| 2018/0088572 A1* | 3/2018 | Uchida | ................ | B60W 30/16 |
| 2018/0093676 A1* | 4/2018 | Emura | ................ | G08G 1/0962 |
| 2018/0105186 A1* | 4/2018 | Motomura | ........... | B60W 50/14 |
| 2018/0233047 A1* | 8/2018 | Mandeville-Clarke | ...................... B60W 30/00 |
| 2018/0322413 A1* | 11/2018 | Yocam | ................... | G06N 20/00 |
| 2018/0354365 A1* | 12/2018 | Tauchi | ................... | B60K 35/10 |
| 2019/0004514 A1 | 1/2019 | Hiwatashi et al. | | |
| 2019/0049994 A1* | 2/2019 | Pohl | ...................... | G08G 1/166 |
| 2019/0126942 A1* | 5/2019 | Goto | ..................... | B60W 40/08 |
| 2019/0283758 A1* | 9/2019 | Arisa | ................ | B60W 30/085 |
| 2019/0315275 A1* | 10/2019 | Kim | ........................... | B60J 1/02 |
| 2020/0120273 A1* | 4/2020 | Kazuyuki | ............. | H04N 5/265 |
| 2020/0180434 A1* | 6/2020 | Tachibana | ............ | B60W 50/14 |
| 2020/0400455 A1* | 12/2020 | Wakayanagi | .......... | B60K 35/81 |
| 2021/0070177 A1* | 3/2021 | Nitze-Nelson | ........... | B60R 1/28 |
| 2021/0166659 A1* | 6/2021 | Takata | ................... | H04R 1/406 |
| 2021/0209949 A1* | 7/2021 | Hisanaga | ................ | G08G 1/16 |
| 2022/0084458 A1* | 3/2022 | Sakuma | .............. | G09G 3/2096 |
| 2022/0340130 A1* | 10/2022 | Motoyama | ............ | G08G 1/165 |
| 2023/0168104 A1 | 6/2023 | Shiratsuchi et al. | | |

FOREIGN PATENT DOCUMENTS

| JP | 2019156144 A | 9/2019 |
|---|---|---|
| JP | 7306333 B2 | 7/2023 |
| WO | WO-2016084149 A1 | 6/2016 |

* cited by examiner

IMAGE PROCESSING DEVICE FOR NOTIFYING AN APPROACH OF AN EMERGENCY VEHICLE

CROSS REFERENCE TO RELATED APPLICATIONS

The present application is a continuation application of International Patent Application No. PCT/JP2021/022161 filed on Jun. 10, 2021, which designated the U.S. and claims the benefit of priority from Japanese Patent Application No. 2020-101593 filed on Jun. 11, 2020. The entire disclosures of all of the above applications are incorporated herein by reference.

TECHNICAL FIELD

The present disclosure relates to an image processing device.

BACKGROUND

There has been known a vehicle control device that executes a control to avoid an emergency vehicle while continuing autonomous driving.

SUMMARY

The present disclosure provides an image processing device that displays an image on a display device mounted to a subject vehicle. The image processing device includes an information acquisition unit, a condition determination unit, and an image change unit. The information acquisition unit acquires information indicating a position of an emergency vehicle. The condition determination unit determines, based on the information acquired by the information acquisition unit, (a) a first condition which is satisfied in response to the emergency vehicle being determined to be approaching the subject vehicle, and (b) a second condition which is satisfied in response to (i) a distance from the emergency vehicle to the subject vehicle or (ii) an estimated reach time required for the emergency vehicle to reach the subject vehicle being equal to or less than a preset threshold. The image change unit changes the image in response to the condition determination unit determining that the first condition and the second condition are satisfied during an autonomous driving state of the subject vehicle. The image change unit generates an overhead view image as an image after change, and the overhead view image includes the subject vehicle and different vehicles existing around the subject vehicle viewed from a viewpoint on a rear side of the subject vehicle.

BRIEF DESCRIPTION OF DRAWINGS

Objects, features and advantages of the present disclosure will become apparent from the following detailed description made with reference to the accompanying drawings. In the drawings.

DETAILED DESCRIPTION

Before describing embodiments of the present disclosure, a related art will be described. An emergency vehicle may approach the vehicle while the vehicle is in autonomous driving state. For example, there has been known a vehicle control device that executes a control to avoid an emergency vehicle while continuing autonomous driving. Inventors of the present disclosure found out the following issues. When an emergency vehicle approaches a subject vehicle, depending on a periphery situation the subject vehicle, it is necessary to change the autonomous driving to a manual driving and to avoid the emergency vehicle by the driver's operation of the vehicle. However, an occupant of the subject vehicle, which is in the autonomous driving state, may fail to perceive an approach of the emergency vehicle.

According to an aspect of the present disclosure, an image processing device that can notify approach of emergency vehicle to an occupant of vehicle is provided.

The present disclosure provides an image processing device that displays an image on a display device mounted to a subject vehicle. The image processing device includes an information acquisition unit, a condition determination unit, and an image change unit. The information acquisition unit acquires information indicating a position of an emergency vehicle. The condition determination unit determines, based on the information acquired by the information acquisition unit, (a) a first condition which is satisfied in response to the emergency vehicle being determined to be approaching the subject vehicle, and (b) a second condition which is satisfied in response to (i) a distance from the emergency vehicle to the subject vehicle or (ii) an estimated reach time required for the emergency vehicle to reach the subject vehicle being equal to or less than a preset threshold. The image change unit changes the image in response to the condition determination unit determining that the first condition and the second condition are satisfied during an autonomous driving state of the subject vehicle. The image change unit generates an overhead view image as an image after change, and the overhead view image includes the subject vehicle and different vehicles existing around the subject vehicle viewed from a viewpoint on a rear side of the subject vehicle.

The image processing device according to the above aspect of the present disclosure can properly notify the approach of emergency vehicle to the occupant of vehicle.

Hereinafter, embodiments of the present disclosure will be described with reference to the drawings.

First Embodiment

1. Configuration of the Onboard System 1

Figure 1:
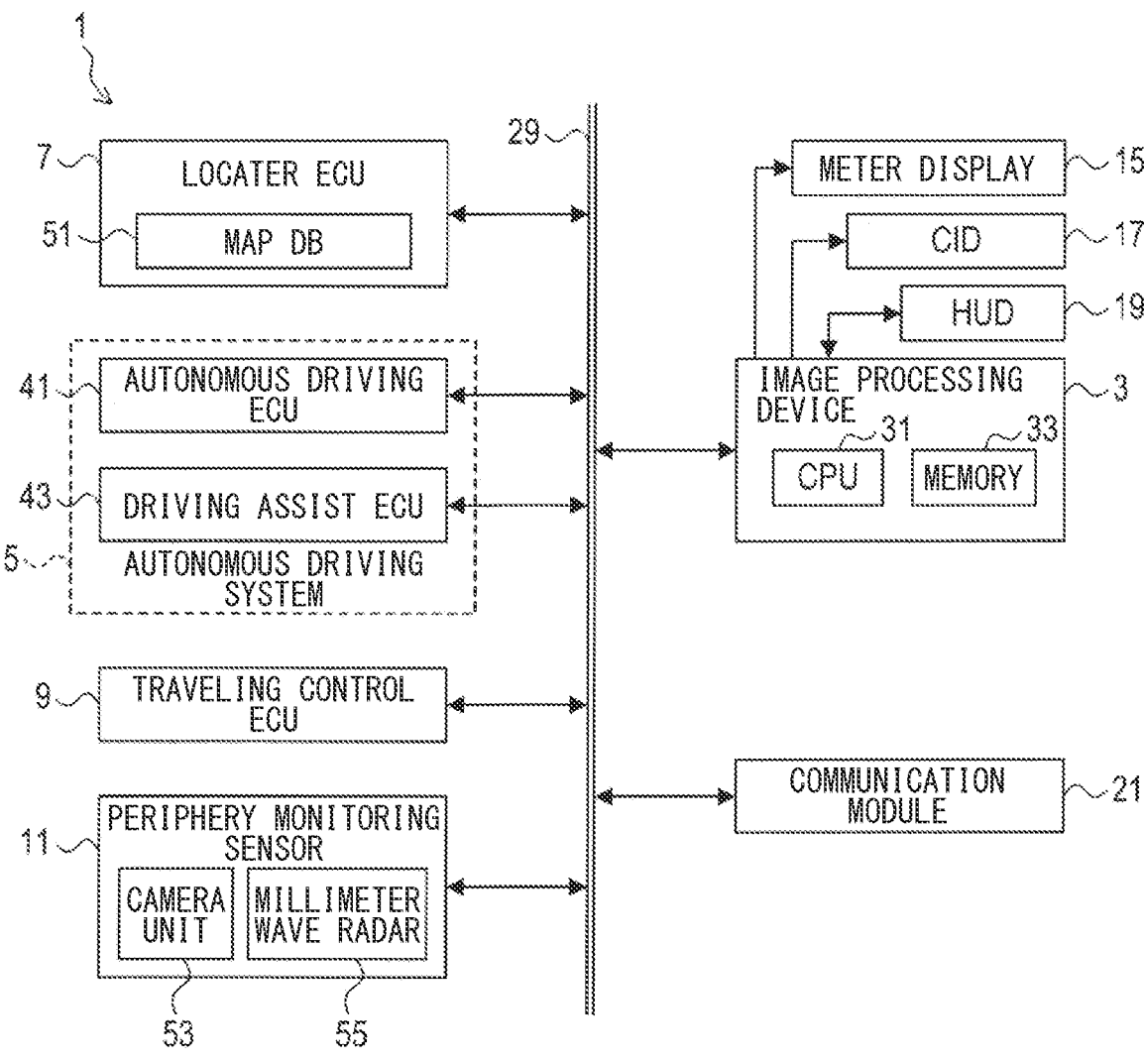
FIG. 1 is a block diagram showing a configuration of an onboard system.
Figure 2:
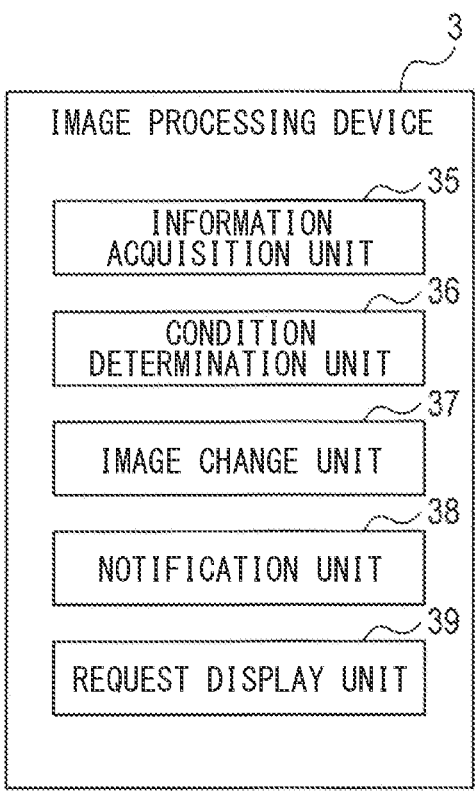
FIG. 2 is a block diagram showing a functional configuration of an image processing device.

The following will describe a configuration of an onboard system 1 with reference to FIG. 1 and FIG. 2. The onboard system 1 is mounted to a subject vehicle 2.

As shown in FIG. 1, the onboard system 1 includes an image processing device 3, an autonomous driving system 5, a locator ECU 7, a traveling control ECU 9, a periphery monitoring sensor 11, a meter display 15, a center information display (CID) 17, a head-up display (HUD) 19, and a communication module 21. Each component of the onboard system 1 is communicably connected one another via a communication bus 29.

The image processing device 3 includes a microcomputer, and the microcomputer includes a CPU 31 and a semiconductor memory (hereinafter referred to as memory 33), such as RAM or ROM.

Each function of the image processing device 3 is implemented by the CPU 31 executing a program stored in a non-transitory tangible storage medium. In this example, the memory 33 corresponds to the non-transitory tangible storage medium that stores the program. A method corresponding to the program is executed when the program is executed by the processor. The image processing device 3 may include one microcomputer, or may include multiple microcomputers.

As shown in FIG. 2, the image processing device 3 includes an information acquisition unit 35, a condition determination unit 36, an image change unit 37, a notification unit 38, and a request display unit 39. The following will describe the function of each component included in the image processing device 3.

The autonomous driving system 5 includes an autonomous driving ECU 41 and a driving assist ECU 43. The autonomous driving ECU 41 is an onboard ECU that implements an autonomous driving function. The autonomous driving is a function that automatically performs a driving operation instead of an occupant of the subject vehicle 2. The autonomous driving ECU 41 enables autonomous driving of, for example, automation level 3 or higher. The automation level of autonomous driving may refer to the automation level defined by the Society of Automotive Engineers (SAE) of America.

The autonomous driving ECU 41 acquires locator information and map information from the locator ECU 7. The locator information and the map information will be described later. The autonomous driving ECU 41 acquires detection information from the periphery monitoring sensor 11. The detection information will be described later. The autonomous driving ECU 41 recognizes a traveling environment of the subject vehicle 2 based on the locator information, the map information, and the detection information. For example, the traveling environment includes a positions and a speed of a target existing around the subject vehicle 2. Examples of the target may include different vehicles 63 existing around the subject vehicle 2, pedestrians, bicycles, animals, fixed objects, lane boundaries, and the like. Further, the traveling environment may include, for example, a position and a shape of a traveling lane on which the subject vehicle 2 is travelling.

The autonomous driving ECU 41 generates a planned traveling line of the subject vehicle 2 based on the recognized traveling environment. The autonomous driving ECU 41 performs, in cooperation with the traveling control ECU 9, acceleration deceleration control and steering control of the subject vehicle 2 so that the subject vehicle 2 travels along the generated planned traveling line.

The driving assist ECU 43 is an onboard ECU that performs a driving assist operation for assisting the driving operation of the occupant of subject vehicle 2. The driving assist ECU 43 enables, for example, advanced driving assistance or partial autonomous driving control, which corresponds to the automation level 2 of autonomous driving.

The locator ECU 7 includes a global navigation satellite system (GNSS) receiver, an inertial sensor, and the like. The locator ECU 7 combines positioning signal received by the GNSS receiver, measurement result of the inertial sensor, vehicle speed information output to the communication bus 29, and the like, and successively specifies a position and a traveling direction of the subject vehicle 2. The locator ECU 7 sequentially outputs locator information to the communication bus 29. The locator information indicates the position and the traveling direction of the subject vehicle 2 and the like.

The locator ECU 7 includes a map database 51. The map database 51 is mainly configured by a large-capacity storage medium. The storage medium stores large amount of map data. The map data includes three-dimensional map data and two-dimensional map data. The three-dimensional map data is high-precision map data. The three-dimensional map data includes information necessary for advanced driving assistance and autonomous driving. The three-dimensional map data includes three-dimensional shape information of road, detailed information of each lane, and the like.

The locator ECU 7 reads, from the map database 51, map data around a current position of the subject vehicle 2. The locator 7ECU provides the map information together with the locator information to the driving assist ECU 43, the autonomous driving ECU 41, and the like. The map information includes the map data read from the map database 51.

The onboard system 1 may acquire the locator information and the map information from a user terminal, such as a smartphone or a navigation device, instead of the locator ECU 7. Then, the onboard system 1 may provide the acquired locator information and map information to the driving assist ECU 43, the autonomous driving ECU 41, and the like.

The traveling control ECU 9 is an electronic control device that mainly includes a microcontroller. The traveling control ECU 9 generates vehicle speed information based on a detection signal of a wheel speed sensor. The wheel speed sensor may be attached to a hub portion of each wheel of the subject vehicle 2. The vehicle speed information indicates a current traveling speed of the subject vehicle 2. The traveling control ECU 9 sequentially outputs vehicle speed information to the communication bus 29.

The traveling control ECU 9, at least, has functions of a brake control ECU and a drive power control ECU. Based on any one of an operation command based on a driving operation performed by the occupant of the subject vehicle 2, a control command from the driving assist ECU 43, and a control command from the autonomous driving ECU 41, the traveling control ECU 9 continuously controls a braking force generated in each wheel and output of driving power source of the subject vehicle 2.

The periphery monitoring sensor 11 is an autonomous driving sensor that monitors a periphery environment of the subject vehicle 2. The periphery monitoring sensor 11 can detect a target existing around the subject vehicle 2. The periphery monitoring sensor 11 provides the detection information to the driving assist ECU 43, the autonomous driving ECU 41, and the like via the communication bus 29. The detection information indicates the position and speed of the detected target, or the like.

The periphery monitoring sensor 11 may include a camera unit 53, a millimeter wave radar 55, or the like. The camera unit 53 may include a monocular camera or a compound-eye camera. The camera unit 53 may take images of a front range, a side range, and a rear range of the subject vehicle 2. The detection information may include at least one of imaging data generated by the camera unit 53 or an analysis result of the imaging data. The imaging data is generated when the camera unit 53 takes images of a periphery range of the subject vehicle 2.

The millimeter wave radar 55 emits millimeter waves or submillimeter waves toward a periphery area of the subject vehicle 2. The millimeter wave radar 55 receives reflected waves reflected by the target. The detection information may include a detection result of the millimeter wave radar 55. The periphery monitoring sensor 11 may include a lidar, a sonar, or the like.

The meter display 15 and the CID 17 each may be provided by a display unit which mainly includes a liquid crystal display or an organic light emitting diode (OLED) display. The meter display 15 and the CID 17 each displays various images on a display screen based on the control signal and image data acquired from the image processing device 3.

The meter display 15 may be installed, for example, in front of a driver's seat of the subject vehicle 2. The CID 17 may be installed, for example, above a center cluster of the subject vehicle 2. The CID 17 has a touch panel function. The CID 17 may detect, for example, a touch operation, a swipe operation, or the like performed on the display screen by the occupant of the subject vehicle 2.

The HUD 19 projects light, which forms images in front of the occupant of the subject vehicle 2, on a windshield based on the control signal and image data acquired from the image processing device 3. The occupant of the subject vehicle 2 visually recognizes the light of image, which is reflected on the windshield toward an inner side of the subject vehicle 2. With this configuration, the HUD 19 can display a virtual image in a space ahead of the windshield. The occupant of the subject vehicle 2 visually recognizes the virtual image displayed by the HUD 19 in superimposed manner with a foreground view of the subject vehicle 2.

Each of the meter display 15, the CID 17, and the HUD 19 corresponds to a display device included in the subject vehicle 2.

The communication module 21 is configured to perform a wireless communication with a communication target located outside of the subject vehicle 2. The communication target may include, for example, an emergency vehicle 73, a management center, or the like. Details of the communication target will be described later.

2. Process Executed by Onboard System 1

The following will describe a process executed by the onboard system 1 with reference to FIG. 3 to FIG. 13. The onboard system 1 executes the process when performing autonomous driving of automation level 3 or higher. The occupant of the subject vehicle 2 does not need to monitor the surroundings of the subject vehicle 2 during autonomous driving of level 3 or higher.

The image processing device 3 displays a normal image 61 on the meter display 15 until an image after change 71 is displayed in S5, which will be described later. The normal images 61 may include, for example, a normal image 61A shown in FIG. 5A, a normal image 61B shown in FIG. 5B, and a normal image 61C shown in FIG. 5C.

The normal image 61A is an image which proposes the occupant of the subject vehicle 2 to relax. The normal image 61B is an overhead view image. The overhead view image shows different vehicles 63 around the subject vehicle 2, the subject vehicle 2, lane boundaries, and the like when viewed from a viewpoint positioned over rear side of the vehicle2. The normal image 61B is a synthesized image synthesized based on information acquired by the periphery monitoring sensor 11. The normal image 61B is updated corresponding to a situation around the subject vehicle 2 detected by the periphery monitoring sensor 11.

The normal image 61C indicates the position of the subject vehicle 2 similar to a navigation device display. The normal image 61C includes a map showing a periphery of the subject vehicle 2. The normal image 61C is, for example, an image indicating a travel route 65 of the subject vehicle 2 and a position 67 of the subject vehicle 2 on the travel route 65. Each of the normal image 61A, the normal image 61B, and the normal image 61C displays the speed of the subject vehicle 2.

Figure 3:
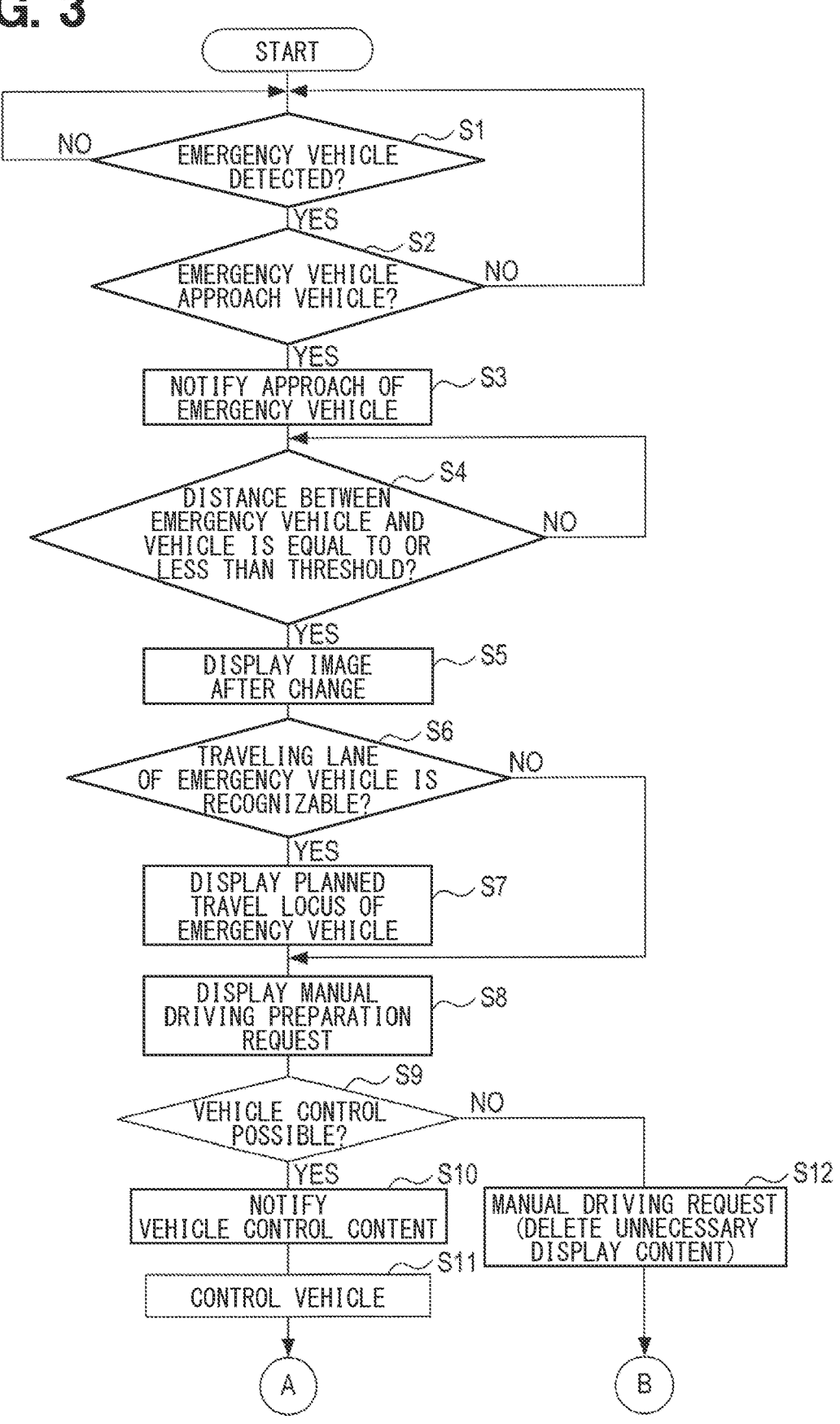
FIG. 3 is a flowchart showing a process executed by the onboard system.

In S1 of FIG. 3, the information acquisition unit 35 of the image processing device 3 acquires, via the communication module 21, information representing a position of the emergency vehicle 73 (hereinafter referred to as emergency vehicle information) from a communication target. The communication target is, for example, the emergency vehicle 73, the management center, or the like. For example, the emergency vehicle information indicates the position of the emergency vehicle 73, a speed of the emergency vehicle 73, a traveling direction of the emergency vehicle 73, a planned travel locus of the emergency vehicle 73, or the like.

The condition determination unit 36 of the image processing device 3 determines whether the emergency vehicle 73 is detected based on the acquired emergency vehicle information. In response to determining that the emergency vehicle 73 is detected, the process proceeds to S2. In response to determining that the emergency vehicle 73 is not detected, the process repeats S1.

In S2, the condition determination unit 36 determines whether the emergency vehicle 73 is approaching the subject vehicle 2 based on the emergency vehicle information acquired in S1. Approaching means that a distance between the subject vehicle 2 and the emergency vehicle 73 becomes shorter over time.

In response to determining that the emergency vehicle 73 is approaching the subject vehicle 2, the process proceeds to S3. In response to determining that the emergency vehicle 73 is not approaching the subject vehicle 2, the process returns to S1. Approaching of the emergency vehicle 73 toward the subject vehicle 2 corresponds to the establishment of a first condition.

Figure 6A:
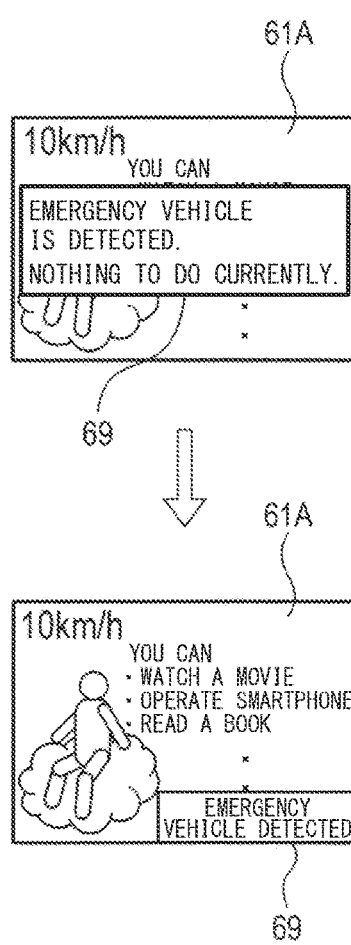
FIG. 6A, FIG. 6B, and FIG. 6C are explanatory diagrams showing respective display modes of approach notification.

In S3, the notification unit 38 of the image processing device 3 notifies the occupant of the subject vehicle 2 that the emergency vehicle 73 is approaching. For example, as shown in FIG. 6A, when the normal image 61A is displayed on the meter display 15, the notification unit 38 first displays an approach notification 69 in a large size at a center area of the normal image 61A. Next, the notification unit 38 displays the approach notification 69 in a small size at a corner of the normal image 61A. The approach notification 69 may indicate approaching of the emergency vehicle 73 toward the subject vehicle 2 in various manner.

Figure 6B:
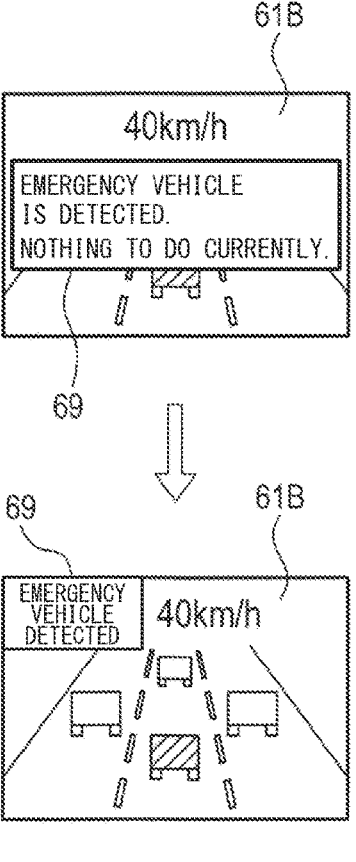
Figure 6C:
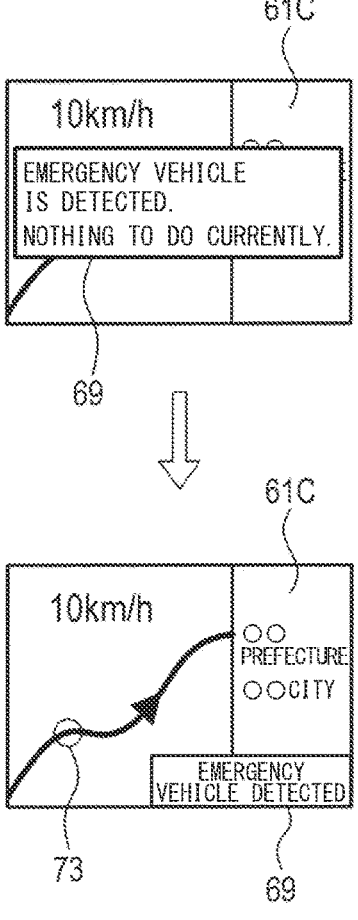

As shown in FIG. 6B and FIG. 6C, when the normal image 61B is displayed on the meter display 15, the notification unit 38 first displays the approach notification 69 in a large size at a center area of the normal image 61, and then displays the approach notification 69 in a small size at a corner of the normal image 61. The notification unit 38 may notify the approach of emergency vehicle 73 by sound, vibration, light emission of an LED, or the like. When the emergency vehicle 73 exists within a display range of the map indicated by the normal image 61C, the notification unit 38 displays the emergency vehicle 73 on the normal image 61C as shown in FIG. 6C.

In S4, the information acquisition unit 35 acquires the emergency vehicle information in the same manner as in S1. Then, the condition determination unit 36 determines whether the distance from the emergency vehicle 73 to the subject vehicle 2 is equal to or less than a preset threshold based on the acquired emergency vehicle information. In response to determining that the distance from the emergency vehicle 73 to the subject vehicle 2 is equal to or less than the threshold, the process proceeds to S5. In response to determining that the distance from the emergency vehicle 73 to the subject vehicle 2 is greater than the threshold, the process repeats S4. When the distance from the emergency vehicle 73 to the subject vehicle 2 is equal to or less than the threshold, the process determines that a second condition is satisfied.

Figures 7A, 7B:
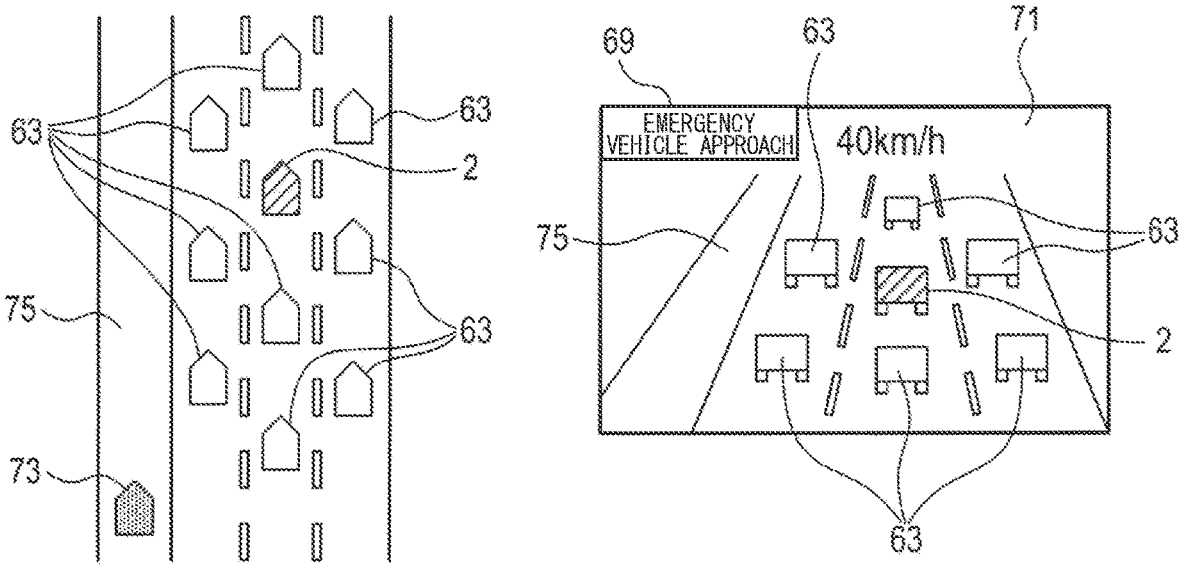
FIG. 7A is an explanatory diagram showing a position of an emergency vehicle and FIG. 7B is an explanatory diagram showing an image after change.

In S5, the image change unit 37 of the image processing device 3 changes the image displayed on the meter display 15 from the normal image 61 to the image after change 71 as shown in FIG. 7B. The image after change 71 is an overhead view image. The image after change 71 is a synthesized image, which is synthesized based on information acquired by the periphery monitoring sensor 11.

A display range of the image after change 71 is enlarged toward the position of the emergency vehicle 73 compared to a display range of the normal image 61B. In the case of the image after change 71 shown in FIG. 7B, the position of emergency vehicle 73 is on a left rear side with respect to the subject vehicle 2 as shown in FIG. 7A. Therefore, the display range of the image after change 71 is enlarged toward the left rear side compared to the display range of the normal image 61B.

Note that the display range of image after change 71 may be moved compared to the display range of the normal image 61B. For example, the image after change 71 may be displayed as if the camera viewpoint is moved compared to the normal image 61B.

In the case shown in FIG. 7A and FIG. 7B, the emergency vehicle 73 is traveling on a road shoulder 75. The display range of the image after change 71 is enlarged toward the road shoulder 75 and includes the road shoulder 75 compared to the display range in the normal image 61B. The image after change 71 includes the approach notification 69, and the approach notification 69 is displayed until the approach notification 69 is deleted in S8.

In S6, the condition determination unit 36 determines whether the lane in which the emergency vehicle 73 is traveling can be recognized based on the emergency vehicle information. In response to determining that the lane in which the emergency vehicle 73 is traveling can be recognized, the process proceeds to S7. In response to determining that the traveling lane of emergency vehicle 73 cannot be recognized, the process proceeds to S8.

Figure 8A:
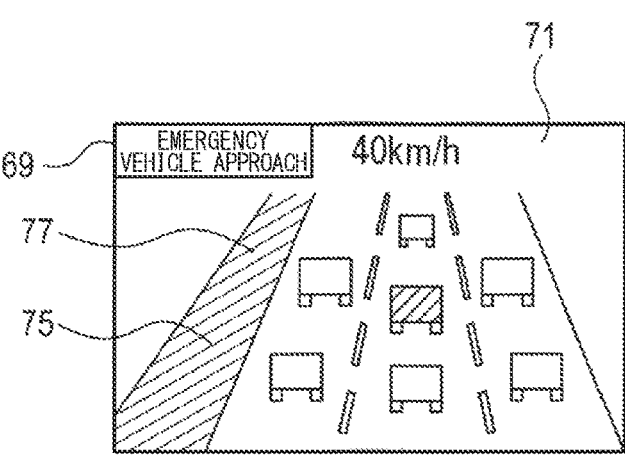
FIG. 8A, FIG. 8B, and FIG. 8C are explanatory diagrams each showing an image after change and including a planned travel locus.
Figure 8B:
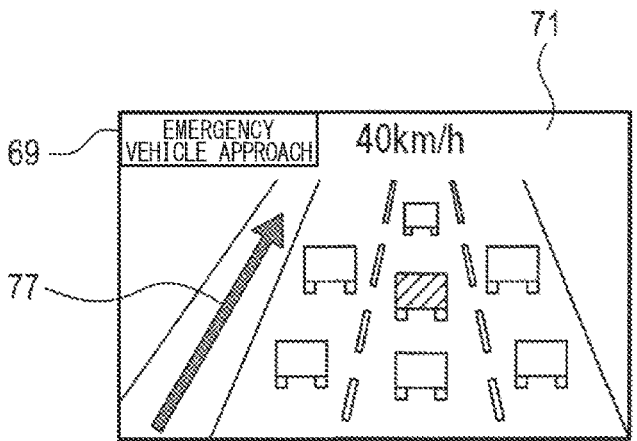
Figure 8C:
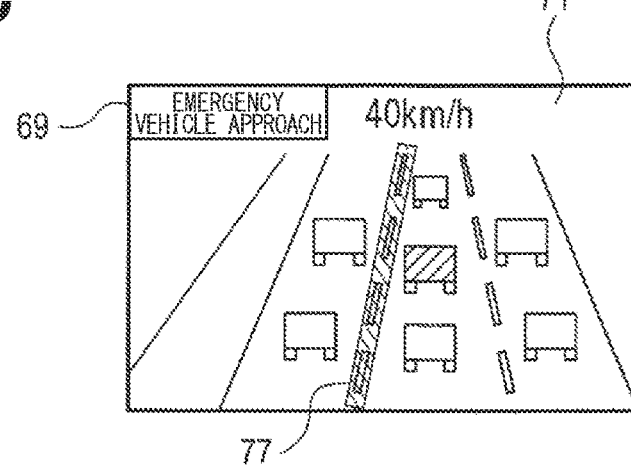

In S7, the image change unit 37 displays a planned travel locus 77 on the image after change 71 as shown in FIG. 8A, FIG. 8B, or FIG. 8C. The planned travel locus 77 represents the planned travel locus of the emergency vehicle 73.

The planned travel locus 77 shown in FIG. 8A is obtained by highlighting the road shoulder 75 on which the emergency vehicle 73 is traveling. When the emergency vehicle 73 is traveling in one normal traveling lane, the planned travel locus 77 is obtained by highlighting the traveling lane in which the emergency vehicle 73 is traveling. The planned travel locus 77 shown in FIG. 8B is indicated by a straight line. The planned travel locus 77 shown in FIG. 8B is indicated by an arrow. The planned travel locus 77 shown in FIG. 8C indicates that the emergency vehicle 73 is traveling between two adjacent traveling lanes. The planned travel locus 77 shown in FIG. 8C is indicated by a straight line.

Figure 9:
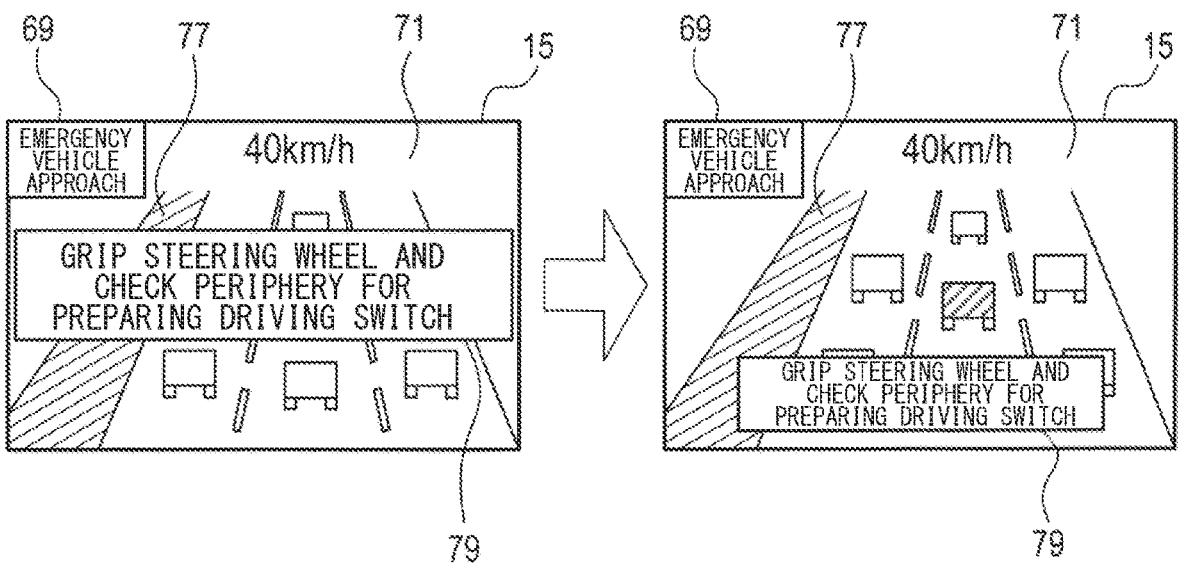
FIG. 9 is an explanatory diagram showing a display mode of request for manual driving preparation.

In S8, the request display unit 39 of the image processing device 3 displays a manual driving preparation request 79 on the meter display 15 as shown in FIG. 9. The manual driving preparation request 79 is displayed in superimposed manner on the image after change 71. The manual driving preparation request 79 is a display requesting the occupant of the subject vehicle 2 to prepare for the manual driving. Preparing for the manual driving may include monitoring the surroundings of the subject vehicle 2 and griping the steering wheel of the subject vehicle 2. The request display unit 39 may request the occupant of the subject vehicle 2 to prepare for the manual driving using sound notification, vibration, LED light emission, or the like.

The request display unit 39, first, displays the manual driving preparation request 79 in a large size at a center area of the meter display 15. Then, when the onboard system 1 detects that the occupant of the subject vehicle 2 has gripped the steering wheel, the request display unit 39 displays the manual driving preparation request 79 in a small size at a corner of the meter display 15.

In S9, the autonomous driving ECU 41 determines whether the vehicle control is possible. The autonomous driving ECU 41 performs the vehicle control to avoid the emergency vehicle 73 and secure a path for the emergency vehicle 73. The vehicle control may include deceleration, traveling at a low speed, stopping, moving toward one end of the traveling lane, moving to another traveling lane or road shoulder, or the like. In response to determining that one of the vehicle controls is possible, the process proceeds to S10. In response to determining that all of the vehicle controls are impossible, the process proceeds to S12.

Figure 10A:
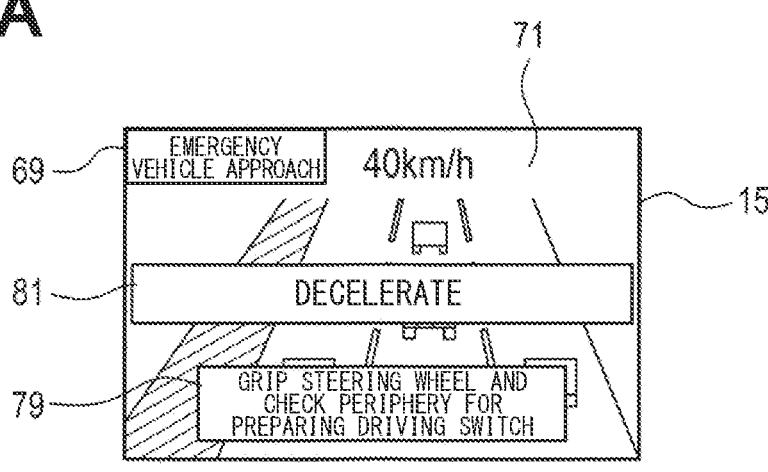
FIG. 10A, FIG. 10B, and FIG. 10C are explanatory diagrams each showing a display mode of vehicle control content notification.
Figure 10B:
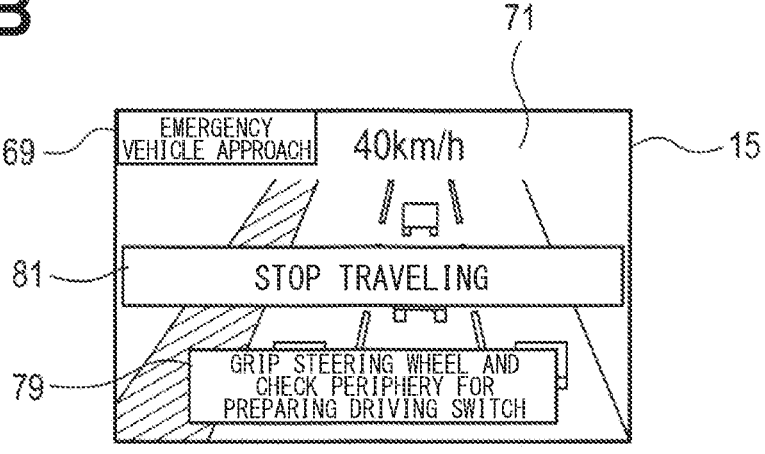
Figure 10C:
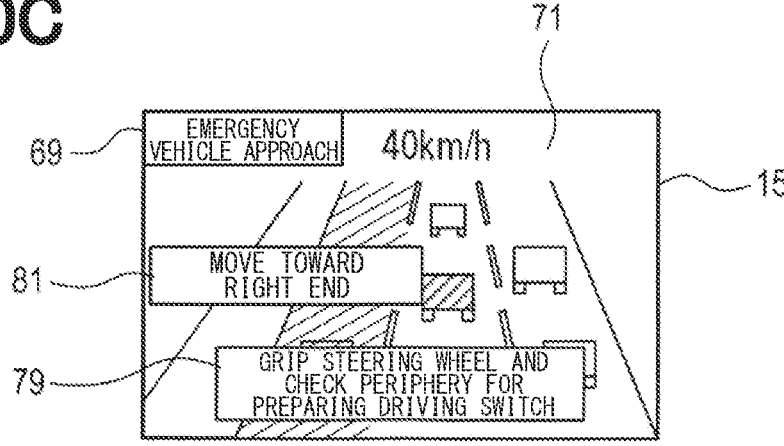

At S10, the autonomous driving ECU 41 determines one vehicle control to be executed from multiple executable vehicle controls. The notification unit 38 of the image processing device 3 acquires information indicating the vehicle control to be executed from the autonomous driving ECU 41. As shown in FIG. 10A, FIG. 10B, or FIG. 10C, the notification unit 38 displays a vehicle control content notification 81 on the meter display 15. The vehicle control content notification 81 is displayed in superimposed manner on the image after change 71. The vehicle control content notification 81 indicates the vehicle control that the autonomous driving ECU 41 is going to execute. In a case shown in FIG. 10A, the vehicle control is deceleration. In a case shown in FIG. 10B, the vehicle control is stop. In a case shown in FIG. 10B, the vehicle control is moving to right end of the traveling lane.

In S11, the autonomous driving ECU 41 performs the vehicle control determined in S10. After S11, the process proceeds to S13.

Figure 13:
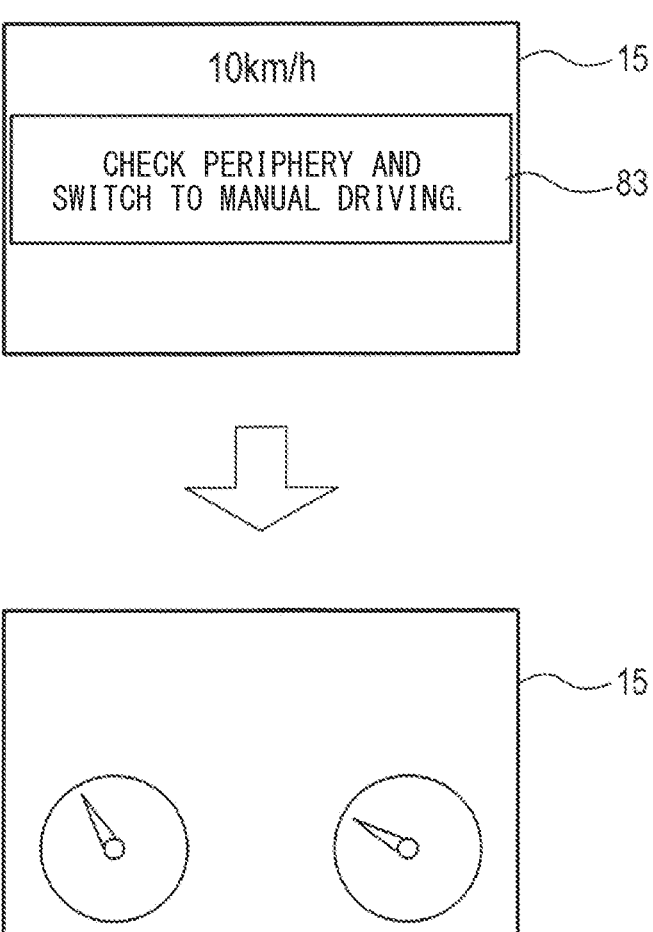
FIG. 13 is an explanatory diagram showing a display mode of manual driving request when driving control is changed to the manual driving before the emergency vehicle passes the subject vehicle.

In S12, the request display unit 39 displays a manual driving request 83 on the meter display 15 as shown in FIG. 13. The manual driving request 83 is a display requesting the occupant of the subject vehicle 2 to change from the autonomous driving to the manual driving. At this time, the request display unit 39 deletes displayed contents except for the vehicle speed and the manual driving request 83. By deleting the displayed contents, the amount of information displayed on the meter display 15 is reduced. As a result, the occupant of the subject vehicle 2 is able to pay more attention to the surroundings of the subject vehicle 2 than the meter display 15.

When the state of the subject vehicle 2 switches to the manual driving and the emergency vehicle 73 passes by the subject vehicle 2, the request display unit 39 deletes the manual driving request 83 as shown in FIG. 13. After deleting the manual driving request 83, the display on the meter display 15 returns to the normal display displayed during the manual driving. After executing S12, the process proceeds to S18.

Figure 4:
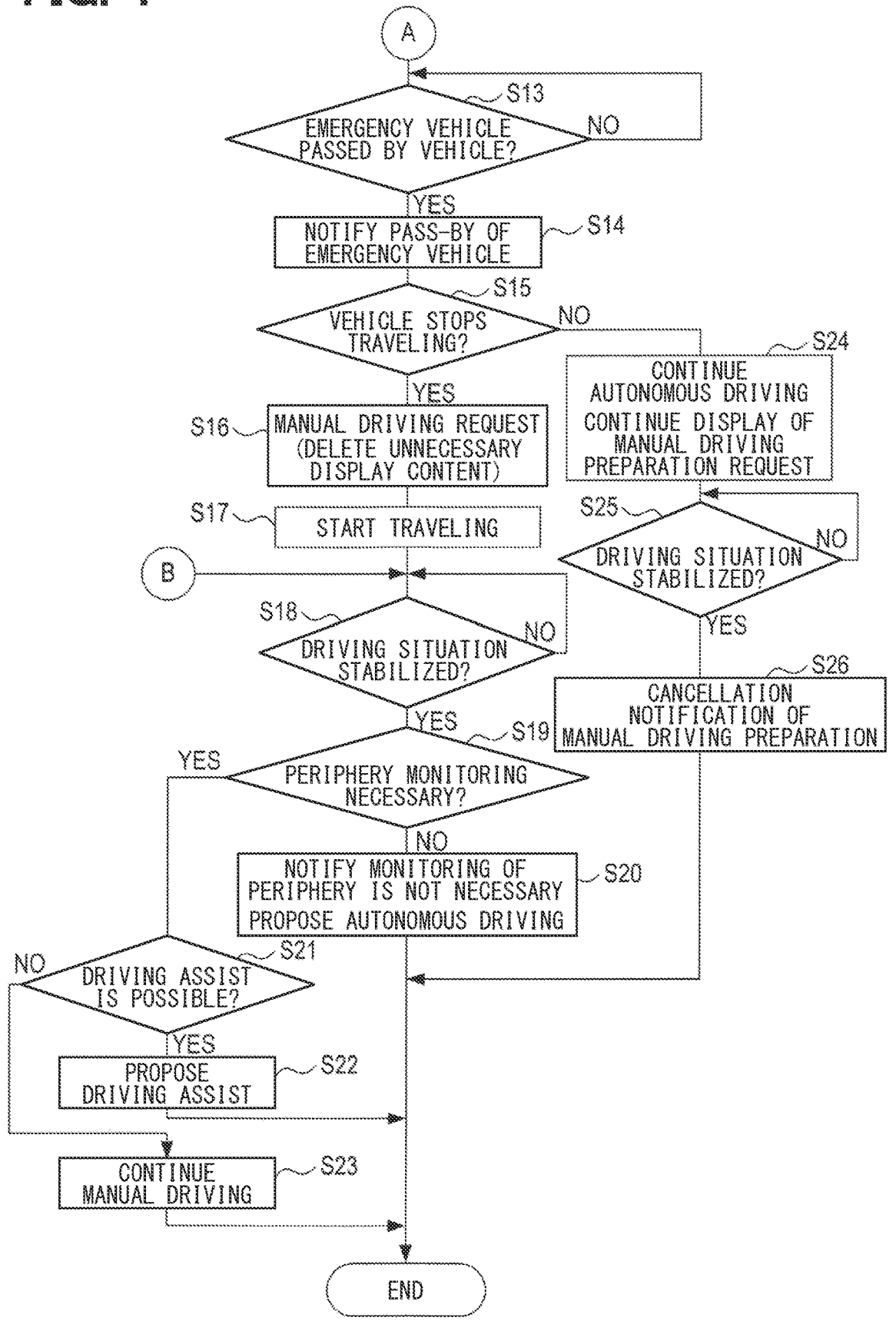
FIG. 4 is a flowchart showing a process executed by the onboard system.
Figure 5A:
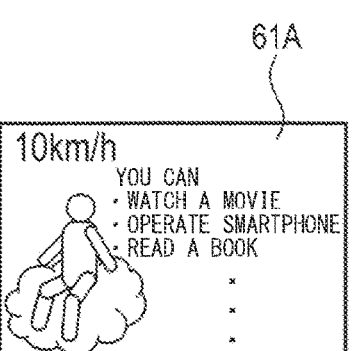
FIG. 5A, FIG. 5B, and FIG. 5C are explanatory diagrams showing normal images.
Figure 5B:
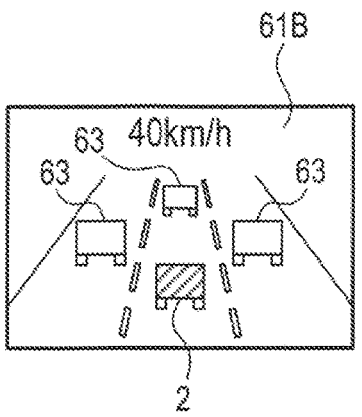
Figure 5C:
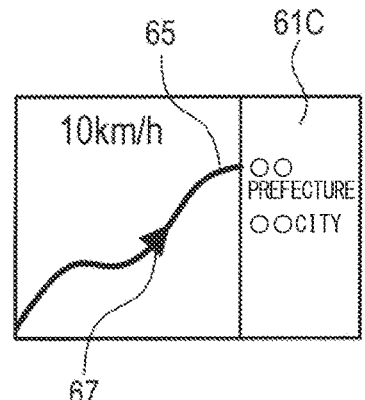

In S13 of FIG. 4, the information acquisition unit 35 acquires the emergency vehicle information from the communication target via the communication module 21. The condition determination unit 36 determines whether the emergency vehicle 73 passes by the subject vehicle 2 based on the acquired emergency vehicle information. In response to determining that the emergency vehicle 73 passed by the subject vehicle 2, the process proceeds to S14. In response to determining that the emergency vehicle 73 has not yet passed by the subject vehicle 2, the process repeats S13.

In S14, the notification unit 38 displays a pass-by notification on the meter display 15. The pass-by notification indicates that the emergency vehicle 73 has already passed by the subject vehicle 2. In S14, the notification unit 38 also deletes the approach notification 69 that is in the displayed state.

In S15, the condition determination unit 36 determines whether the subject vehicle 2 has stopped by the vehicle control performed in S11. In response to determining that the subject vehicle 2 is stopped, the process proceeds to S16. In response to determining that the subject vehicle 2 is not stopped, the process proceeds to S24.

Figure 11:
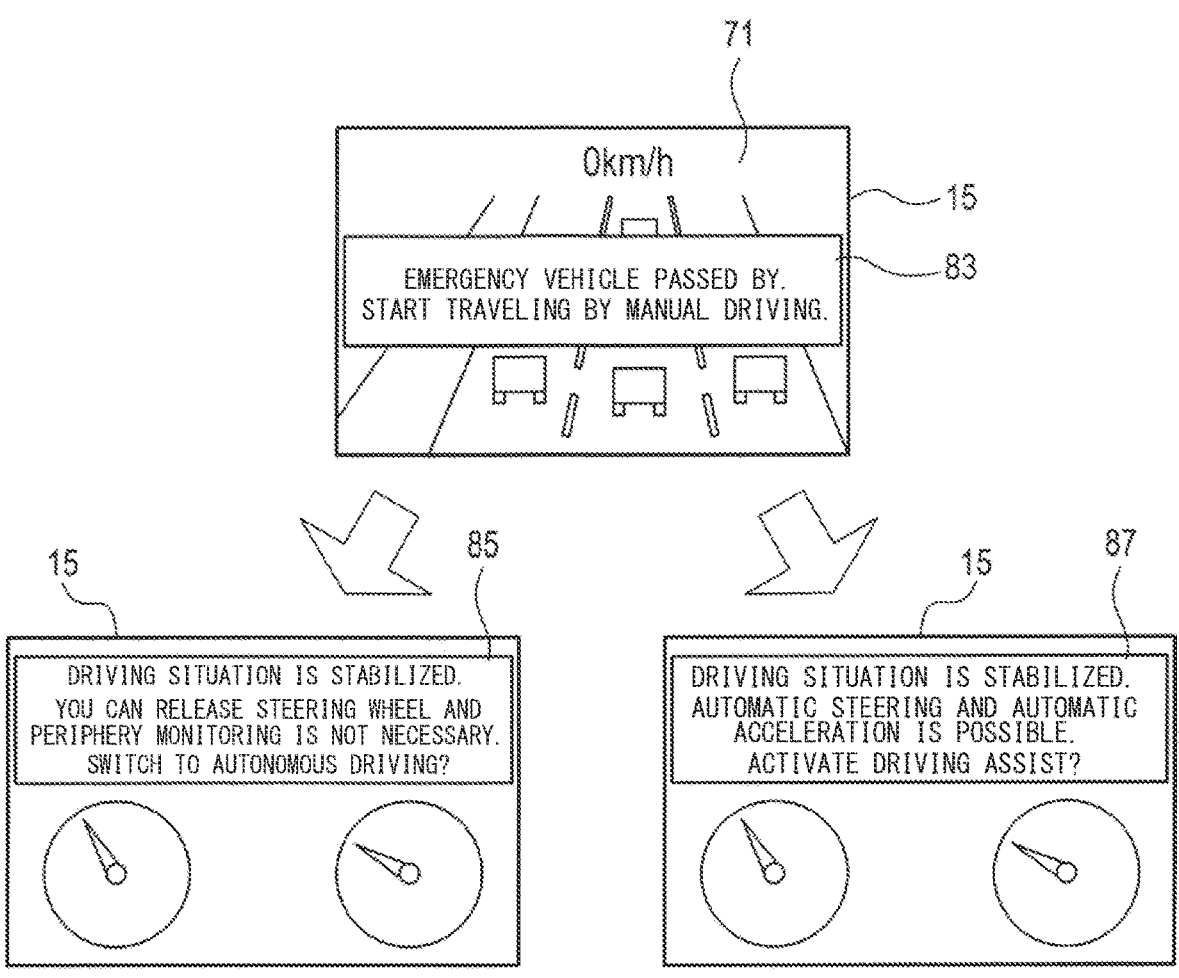
FIG. 11 is an explanatory diagram showing a display mode of manual driving request, autonomous driving proposal, and driving assistance proposal when a subject vehicle is in a stop state and the emergency vehicle passes the subject vehicle.

In S16, the request display unit 39 displays the manual driving request 83 on the meter display 15 as shown in FIG. 11. The manual driving request 83 is displayed in superimposed manner on the image after change 71. At the same time, the request display unit 39 deletes unnecessary displayed content. For example, the unnecessary displayed content may include the manual driving preparation request 79 The occupant of the subject vehicle 2 switches from the autonomous driving to the manual driving in response to the manual driving request 83.

In S17, the traveling control ECU 9 starts the subject vehicle 2 based on the occupant's driving operation of the subject vehicle 2.

In S18, the autonomous driving ECU 41 determines whether the driving situation is stabilized. A stable driving situation may include a case where the emergency vehicle 73 has already passed by the subject vehicle 2 and different vehicles around the subject vehicle 2 are able to perform normal traveling. In response to determining that the driving situation is stabilized, the process proceeds to S19. In response to determining that the driving situation is not yet stabilized, the process repeats S18.

In S19, the autonomous driving ECU 41 determines whether monitoring of the periphery of the vehicle by the occupant of the subject vehicle 2 is necessary. For example, when the subject vehicle 2 is in an area that supports autonomous driving of automation level 3 or higher, it is not necessary for the occupant to monitor the periphery of the subject vehicle 2. The area that supports autonomous driving of automation level 3 or higher may include, for example, roads exclusively for automobile use and road with traffic congestion. In response to determining that the monitoring of periphery of the subject vehicle 2 is not necessary, the process proceeds to S20. In response to determining that the monitoring of periphery of the subject vehicle 2 is necessary, the process proceeds to S21.

In S20, the notification unit 38 displays an autonomous driving proposal 85 on the meter display 15 as shown in FIG. 11. The autonomous driving proposal 85 is a notification that proposes to the occupant of the subject vehicle 2 to start autonomous driving. The autonomous driving proposal 85 may also inform the occupant of the subject vehicle 2 that monitoring of the periphery of the subject vehicle 2 is not necessary and griping of steering wheel of the subject vehicle 2 is not necessary.

In S21, the driving assist ECU 43 determines whether the driving assist is possible. In response to determining that the driving assist is possible, the process proceeds to S22. In response to determining that the driving assist is impossible, the process proceeds to S23.

In S22, the notification unit 38 displays a driving assist proposal 87 on the meter display 15 as shown in FIG. 11. The driving assist proposal 87 is displayed in superimposed manner on the image after change 71. The driving assist proposal 87 is a notification that proposes to the occupant of the subject vehicle 2 to start driving assist.

In S23, the onboard system 1 continues the state of manual driving.

Figure 12:
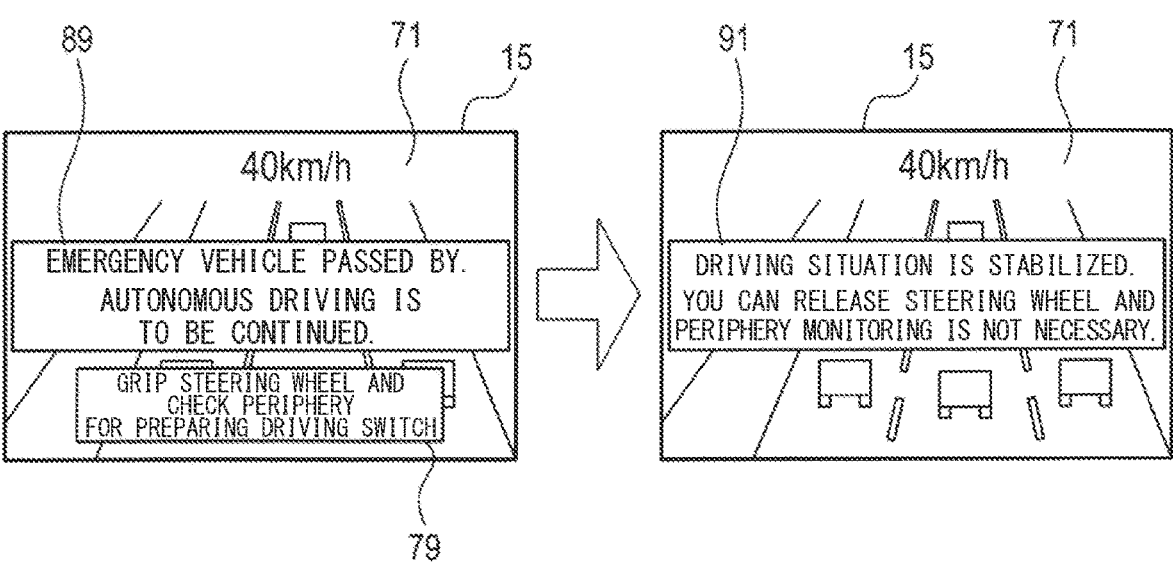
FIG. 12 is an explanatory diagram showing a display mode of autonomous driving continuation notification and cancellation notification when the subject vehicle is not in the stop state and the emergency vehicle passes the subject vehicle.

In S24, the autonomous driving ECU 41 continues the autonomous driving. The notification unit 38 displays an autonomous driving continuation notification 89 on the meter display 15 as shown in FIG. 12. The autonomous driving continuation notification 89 is displayed in superimposed manner on the image after change 71. The autonomous driving continuation notification 89 indicates that autonomous driving is to be continued. The request display unit 39 continuously displays the manual driving preparation request 79 on the meter display 15.

In S25, the autonomous driving ECU 41 determines whether the driving situation is stabilized. In response to determining that the driving situation is stabilized, the process proceeds to S26. In response to determining that the driving situation is not yet stabilized, the process repeats S25.

In S26, the request display unit 39 displays a cancellation notification 91 on the meter display 15 as shown in FIG. 12. The cancellation notification 91 is displayed in superimposed manner on the image after change 71. The cancellation notification 91 may also inform the occupant of the subject vehicle 2 that monitoring of the periphery of the subject vehicle 2 is not necessary and griping of steering wheel of the subject vehicle 2 is not necessary. When the cancellation notification 91 is displayed, the request display unit 39 deletes the manual driving preparation request 79.

3. Effects of Image Processing Device 3

(1A) The image processing device 3 acquires the emergency vehicle information. Based on the emergency vehicle information, the image processing device 3 determines (a) the first condition whether the emergency vehicle 73 is approaching the subject vehicle 2, and (b) the second condition whether the distance from the emergency vehicle 73 to the vehicle is equal to or less than the preset threshold. When the image processing device 3 determines that the first condition and the second condition are satisfied during the autonomous driving state of the subject vehicle 2, the image processing device 3 changes the image displayed on the meter display 15 from the normal image 61 to the image after change 71. The image after change 71 is an overhead view image.

The image displayed on the meter display 15 is changed from the normal image 61 to the image after change 71. Thus, the occupant of the subject vehicle 2 can recognize that the emergency vehicle 73 is approaching the subject vehicle 2 and the distance from the emergency vehicle 73 to the subject vehicle 2 is equal to or less than the preset threshold.

(1B) The image after change 71 displays the planned travel locus 77 of the emergency vehicle. Thus, the occupant of the subject vehicle 2 can recognize the planned traveling position of the emergency vehicle 73 by confirming the displayed planned travel locus 77.

(1C) When the image processing device 3 determines that the first condition and the second condition are satisfied during the autonomous driving state of the subject vehicle 2, the image processing device 3 displays the manual driving preparation request 79 on the meter display 15. Thus, the occupant of the subject vehicle 2 can prepare for switching from the autonomous driving to the manual driving by viewing the manual driving preparation request 79.

(1D) The normal image 61B is an overhead view image. The display range of image after change 71 is enlarged toward the position of the emergency vehicle 73 compared to the display range of normal image 61B. Thus, the occupant of the subject vehicle 2 can recognize the position and direction of the emergency vehicle 73 by comparing the display range of image after change 71 and the display range of normal image 61B.

OTHER EMBODIMENTS

Although an embodiment of the present disclosure have been described above, the present disclosure is not limited to the embodiments described above, and various modifications can be made to implement the present disclosure.

Figure 14:
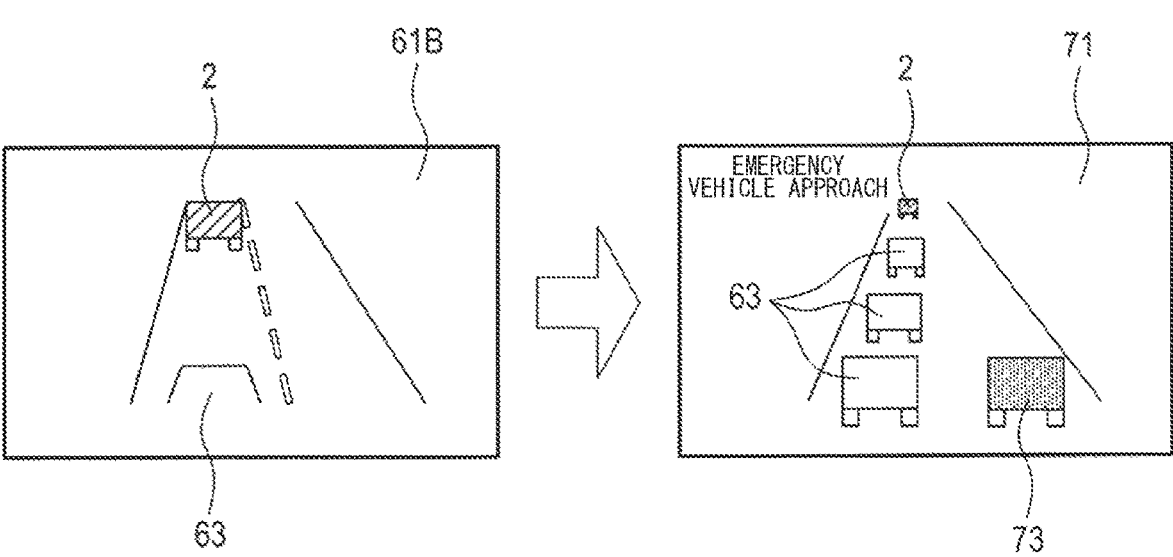
FIG. 14 is an explanatory diagram showing an image after change in which a display range includes the position of the emergency vehicle.

(1) For example, as shown in FIG. 14, the display range of image after change 71 may include the position of emergency vehicle 73. In this case, the occupant of the subject vehicle 2 can confirm the position of emergency vehicle 73 in more details by viewing the image after change 71.

(2) The determination in S4 may be changed. For example, the process may determine, in S4, whether an estimated time required for the emergency vehicle 73 to reach the subject vehicle 2 (hereinafter referred to as estimated reach time) is equal to or less than a preset threshold. In response to determining that the estimated reach time is equal to or less than the threshold, the process proceeds to S5. In response to determining that the estimated reach time is greater than the threshold, the process repeats S4. The estimated reach time may be calculated based on, for example, a change in relative position of the emergency vehicle 73 with respect to the position of the subject vehicle 2.

(3) A display device other than the meter display 15 may be used to display the normal image 61 and the image after change 71. The display device other than the meter display 15 may include the CID 17, the HUD 19, or the like.

(4) The necessary conditions for displaying the manual driving preparation request 79 on the meter display 15 in S8 may include affirmative determinations in S1 and S2 and that the distance from the emergency vehicle 73 to the subject vehicle 2 is equal to or less than a specific threshold. The specific threshold may be the same as the above-described preset threshold used in S4, or may be different from the above-described preset threshold used in S4.

(5) The image processing device 3 and the method thereof according to the present disclosure may be achieved by a dedicated computer provided by constituting a processor and a memory programmed to execute one or more functions embodied by a computer program. Alternatively, the image processing device 3 and the method thereof according to the present disclosure may be achieved by a dedicated computer provided by constituting a processor with one or more dedicated hardware logic circuits. Alternatively, the image processing device 3 and the method thereof according to the present disclosure may be achieved using one or more dedicated computers constituted by a combination of the processor and the memory programmed to execute one or more functions and the processor with one or more hardware logic circuits. The computer program may also be stored in a computer readable non-transitory tangible storage medium as computer executable instructions. The technique for implementing the functions of the respective units included in the image processing device 3 does not necessarily need to include software, and all of the functions may be implemented with the use of one or multiple hardware circuits.

(6) Multiple functions of one configuration element in the above embodiment may be implemented by multiple configuration elements, or a single function of one configuration element may be implemented by multiple configuration elements. Multiple functions of multiple components may be implemented by one component, or one function implemented by multiple components may be implemented by one component. A part of the configuration in the above embodiments may be omitted. At least a part of the configuration in one embodiment may be added to or substituted for the configuration of another embodiment.

(7) The present disclosure can be also achieved in various forms other than the image processing device 3 described above, such as the onboard system 1 that includes the image processing device 3 as a component, a program for controlling a computer to function as the image processing device 3, a non-transitory tangible storage medium, such as a semiconductor memory, having the program stored therein, a display control method, or the like.

What is claimed is:

1. An image processing device configured to control a display device mounted to a subject vehicle, the image processing device comprising:

an information acquisition unit acquiring information indicating a position of an emergency vehicle;

a condition determination unit determining, based on the information acquired by the information acquisition unit, (a) a first condition which is satisfied in response to the emergency vehicle being determined to be approaching the subject vehicle, and (b) a second condition which is satisfied in response to (i) a distance from the emergency vehicle to the subject vehicle or (ii) an estimated reach time required for the emergency vehicle to reach the subject vehicle being equal to or less than a preset threshold; and an image change unit configured to:

generate and display on the display device, in response to the condition determination unit determining that the first condition has been satisfied during an autonomous driving state of the subject vehicle, a first overhead view image that includes the subject vehicle and different vehicles existing around the subject vehicle viewed from a viewpoint on a rear side of the subject vehicle together with an approach notification indicating the emergency vehicle is approaching the subject vehicle, the first overhead view image having a first display range; and generate and display on the display device, in response to the condition determination unit determining that the second condition has been satisfied after determining that the first condition has been satisfied, a second overhead view image having a display range enlarged in a direction toward a current position of the emergency vehicle compared with a display range of the first overhead view image, the second overhead view image including the subject vehicle and at least one of the emergency vehicle or a travel locus of the emergency vehicle displayed together on the display device, the second overhead view image having a second display range;

wherein the second display range includes a new area not displayed in the first overhead view image, the new area being within the direction toward the current position of the emergency vehicle, and the second overhead view image includes a planned travel locus of the emergency vehicle displayed within at least a portion of the new area.

2. The image processing device according to claim 1, further comprising:

a request display unit displaying, on the display device, a manual driving preparation request in response to the condition determination unit determining that the first condition and the second condition have both been satisfied during the autonomous driving state of the subject vehicle.

3. The image processing device according to claim 1, wherein:

the image change unit is further configured to generate the second overhead view image to include the position of the emergency vehicle.

4. The image processing device according to claim 1, wherein:

the display device displays a map including a periphery area of the subject vehicle, and when the position of the emergency vehicle is included in a display range of the map, the emergency vehicle is displayed on the map.

5. An image processing device configured to control a display device mounted to a subject vehicle, the image processing device comprising:

a computer-readable non-transitory storage medium; and a microcomputer that, by executing a program stored in the computer-readable non-transitory storage medium, is configured to:

acquire information indicating a position of an emergency vehicle;

determine, based on the acquired information, (a) a first condition which is satisfied in response to the emergency vehicle being determined to be approaching the subject vehicle, and (b) a second condition which is satisfied in response to (i) a distance from the emergency vehicle to the subject vehicle or (ii) an estimated reach time required for the emergency vehicle to reach the subject vehicle being equal to or less than a preset threshold;

generate and display on the display device, in response to determining that the first condition has been satisfied during an autonomous driving state of the subject vehicle, a first overhead view image that includes the subject vehicle and different vehicles existing around the subject vehicle viewed from a viewpoint on a rear side of the subject vehicle together with an approach notification indicating the emergency vehicle is approaching the subject vehicle, the first overhead view image having a first display range; and generate and display on the display device, in response to determining that the second condition has been satisfied after determining that the first condition has been satisfied, a second overhead view image having a display range enlarged in a direction toward a current position of the emergency vehicle compared with a display range of the first overhead view image, the second overhead view image including the subject vehicle and at least one of the emergency vehicle or a travel locus of the emergency vehicle displayed together on the display device, the second overhead view image having a second display range;

wherein the second display range includes a new area not displayed in the first overhead view image, the new area being within the direction toward the current position of the emergency vehicle, and the second overhead view image includes a planned travel locus of the emergency vehicle displayed within at least a portion of the new area.

\* \* \* \* \*